United States Patent
Cho et al.

(10) Patent No.: US 8,233,908 B2
(45) Date of Patent: Jul. 31, 2012

(54) METHOD AND APPARATUS TO DYNAMICALLY SELECT A FREQUENCY BETWEEN BASIC SERVICE SETS IN A SAME CHANNEL

(75) Inventors: Kyung-ik Cho, Seoul (KR); Seong-sin Joo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 682 days.

(21) Appl. No.: 11/684,238

(22) Filed: Mar. 9, 2007

(65) Prior Publication Data

US 2007/0218890 A1   Sep. 20, 2007

(30) Foreign Application Priority Data

Mar. 17, 2006   (KR) .................. 10-2006-0024760

(51) Int. Cl.
*H04W 72/00* (2009.01)
(52) U.S. Cl. .............. 455/450; 455/426.1; 455/552.1; 455/296; 455/557; 455/509; 370/329; 370/341; 370/437; 370/219; 370/242
(58) Field of Classification Search .......... 370/329, 370/341, 437, 281, 62, 427, 219, 242; 455/130, 455/671.3, 296, 557, 426.1, 552.1, 450, 509; 379/219, 242
See application file for complete search history.

(56) References Cited

U.S. PATENT DOCUMENTS

| 5,933,420 | A   | * | 8/1999  | Jaszewski et al. ........... 370/329 |
| 6,834,045 | B1  | * | 12/2004 | Lappetelainen et al. ...... 370/329 |
| 2002/0191769 | A1 | * | 12/2002 | Duponchel et al. .......... 379/219 |
| 2004/0151137 | A1 |   | 8/2004  | McFarland et al. |

FOREIGN PATENT DOCUMENTS

KR   2004-76865   9/2004

* cited by examiner

*Primary Examiner* — Kamran Afshar
*Assistant Examiner* — Manpreet Matharu
(74) *Attorney, Agent, or Firm* — Stanzione & Kim, LLP

(57) ABSTRACT

A method and an apparatus to perform efficient dynamic frequency selection between basic service sets in the same channel for wireless LAN using a 5 gigahertz frequency band. Provided also are a method and an apparatus to perform efficient channel selection corresponding to basic service sets in the same channel regardless of negotiation capability of a second device by performing negotiation corresponding to a channel to be used by a first device and a channel to be used by a second device and selecting a channel to be used by the first device based on a negotiation result.

20 Claims, 11 Drawing Sheets

METHOD AND APPARATUS TO DYNAMICALLY SELECT A FREQUENCY BETWEEN BASIC SERVICE SETS IN A SAME CHANNEL

CROSS-REFERENCE TO RELATED APPLICATIONS

This application claims priority under 35 U.S.C. §119(a) Korean Patent Application No. 10-2006-0024760, filed on Mar. 17, 2006, in the Korean Intellectual Property Office, the disclosure of which is incorporated herein in its entirety by reference.

BACKGROUND OF THE INVENTION

1. Field of the Invention

The present general inventive concept relates to a method and an apparatus to efficiently perform dynamic frequency selection (DFS), and more particularly, to a method and an apparatus to efficiently perform DFS between basic service sets (BSSs) which include wireless LAN stations that use a predetermined frequency band, for example, a 5 gigahertz frequency band, and which exist in the same channel, regardless of negotiation capability of a DFS owner.

2. Description of the Related Art

According to IEEE 802.11 and IEEE 802.11h standards, terms used in frequency selection are defined as follows.

A BSS (basic service set) is a communication area consisting of a group of any number of stations which communicate with each other in the same channel. Wireless LAN uses the BSS as a standard building block for communication.

A station is a basic component of the BSS and is any device capable of wireless communication.

A DFS owner is a station which detects radar operating in the same channel and then selects a new channel to switch to. In an independent BSS, any station can be a DFS owner.

As communication techniques rapidly develop, various methods of wireless communication are being used to cope with tasks usually performed by wired communication which necessarily requires wire. One method of wireless communication known as the IEEE 802.11 family of standards has recently become very prominent. IEEE 802.11 standard includes a/b/g/(n) amendments with respect to frequencies and methods of communication. The IEEE 802.11a standard uses a 5 gigahertz (GHz) band for communication. However, the 5 GHz band is already used by radar for meteorological observation, satellite navigation, and satellite communication, as well as for military purposes. International Telecommunications Union—Radiocommunications (ITU-R), European Telecommunications Standards Institute (ETSI), and Federal Communications Commission (FCC) acknowledge that wireless LAN using the 5 GHz band causes serious problems to radar and suggest that the effect on radar signals be minimized by using DFS or transmit power control (TPC). DFS is a method enabling a BSS to detect radar signals and resume communication in a new channel in which radar does not operate. The IEEE 802.11h standard defines for detecting radar signals and notifying constituents of a network of detected radar signals such that they may switch channels.

DFS according to the IEEE 802.11h standard is used to avoid a circumstance where a BSS operates on the same channel as radar and is limited to function when only one BSS exists. However, wireless LAN techniques have rapidly developed recently and a plurality of BSSs may exist in the same channel. Conventional techniques do not provide a protocol between BSSs, and as a result, all the BSSs affected by radar can switch channels out of an original channel and switch to the same new channel. As a result, the original channel may be emptied and quality of service (QoS) of the new channel may decrease to a level where appropriate communication may not be performed.

FIGS. 1A through 1D illustrate problems which may be caused by a conventional DFS when two or more BSSs exist together in the same channel or when two or more BSSs and radar exist together in the same channel.

Figure 1A:
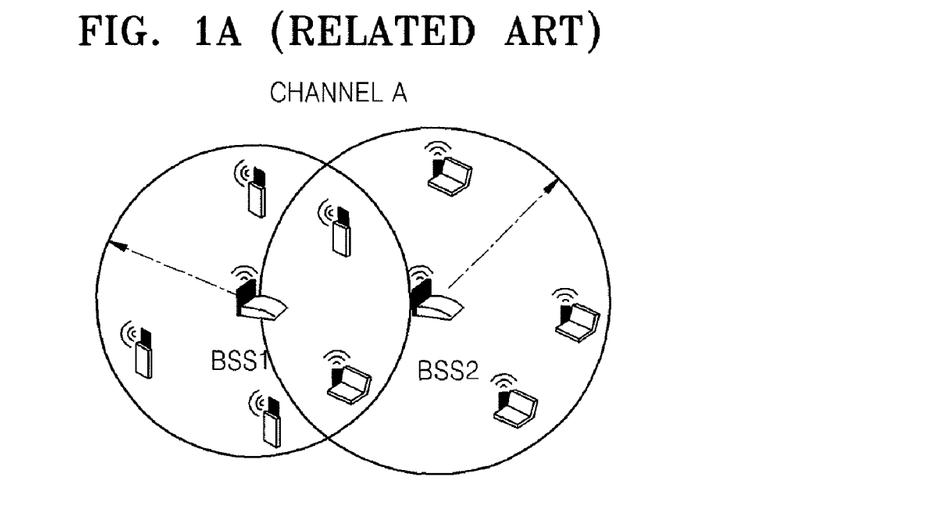
FIGS. 1A through 1D illustrate problems which can be caused by a conventional dynamic frequency selection (DFS) when two or more basic service sets (BSSs) exist together in the same channel or when two or more BSSs and radar exist together in the same channel.

FIG. 1A illustrates BSS1 and BSS2 existing in a same channel.

Referring to FIG. 1A, when BSS1 and BSS2 exist in a same channel A, each BSS is affected by communication of the other, thus QoS of the original channel drops below a predetermined level. Accordingly, appropriate communication may not be performed. To avoid this problem, a conventional DFS mechanism provides a method to switch channels. However, the conventional DFS mechanism does not provide a protocol between the BSSs in the same channel, and as a result, BSS1 and BSS2 cannot negotiate with each other to determine which channels to switch to. Therefore, BSS1 and BSS2 switch to new channels not knowing which channel the other BSS switches to.

Figure 1B:
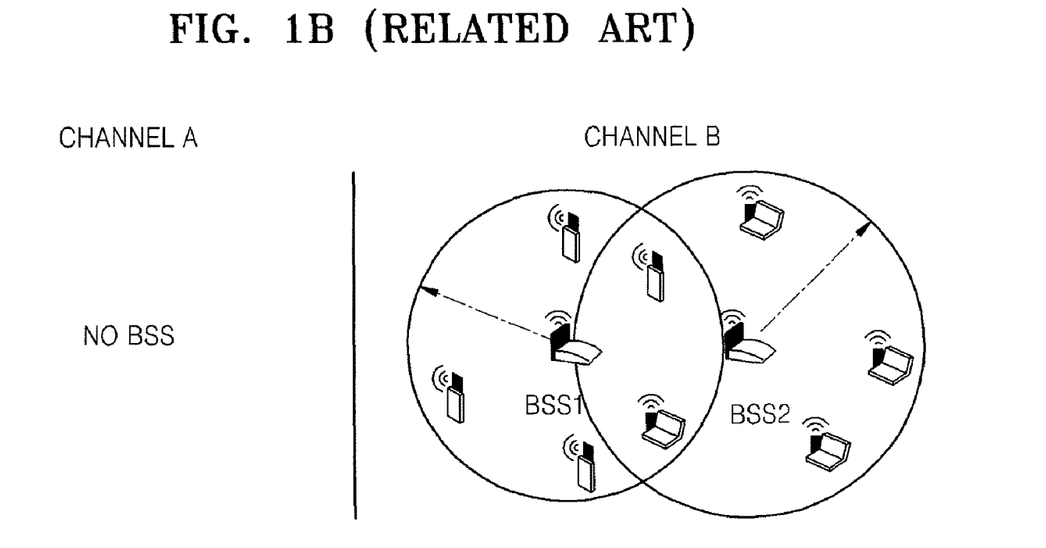

FIG. 1B illustrates BSS1 and BSS2 of FIG. 1A which have switched channels according to a conventional DFS.

Referring to FIG. 1B, since BSS1 and BSS2 of FIG. 1A switch channels by a conventional DFS without information on which channel the other BSS switches to, both BSS1 and BSS2 can switch from channel A to channel B together. In this case, the same problems that the BSSs had in channel A may occur in channel B, and the channel switching is performed meaninglessly.

Figure 1C:
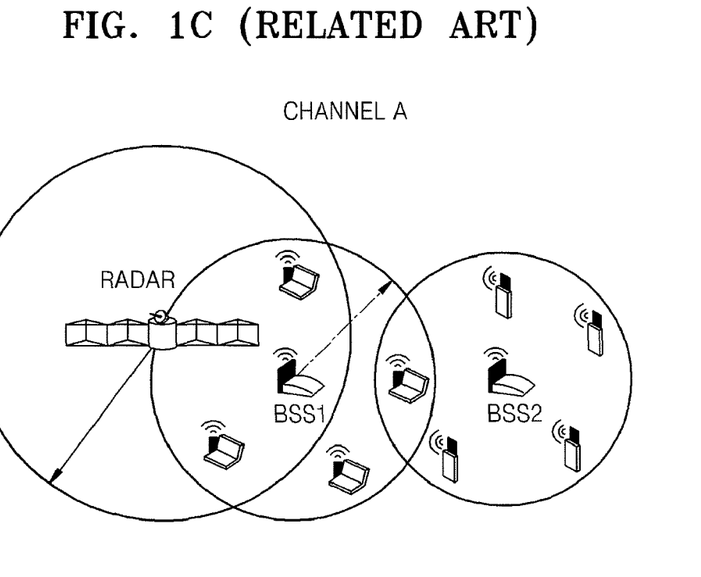

FIG. 1C illustrates BSS1 and BSS2 and radar existing in a same channel.

Referring to FIG. 1C, when BSS1 and BSS2 exist in a same channel A and the radar transmits in channel A, BSS1 and BSS2 have to switch to new channels to avoid the radar using a DFS mechanism. However, as in FIG. 1C, the conventional DFS mechanism does not provide a protocol between the BSSs in the same channel, and as a result, BSS1 and BSS2 cannot negotiate with each other to ascertain which channels to switch to. Therefore, BSS1 and BSS2 switch to new channels not knowing which channel the other BSS switches to.

Figure 1D:
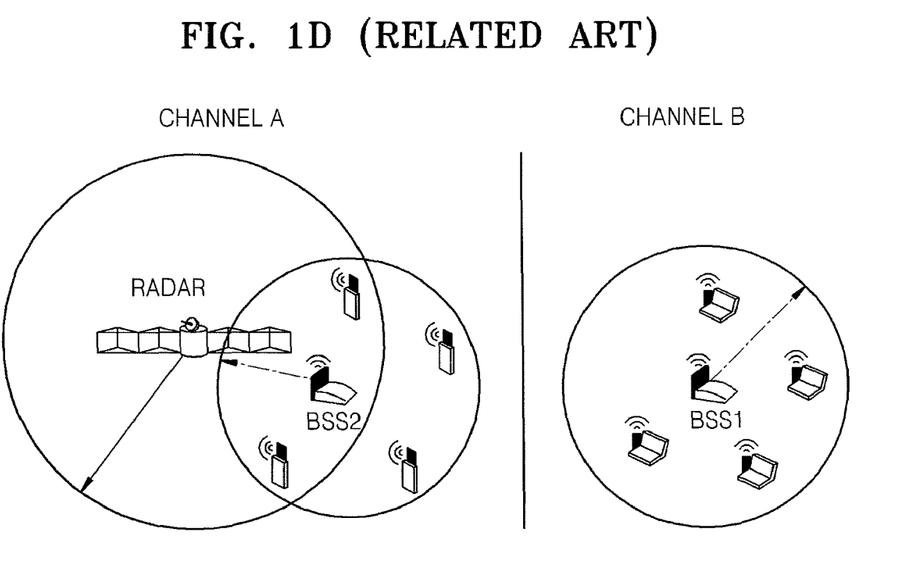

FIG. 1D illustrates BSS1, BSS2 and the radar of FIG. 1C in which BSS1 and BSS2 have switched channels according to a conventional DFS.

Referring to FIG. 1D, BSS1 and BSS2 of FIG. 1C switch to new channels using a conventional DFS method without obtaining information regarding which channel the other BSS switches to. However, a BSS can detect radar prior to or posterior to channel switching in accordance with its capability. As illustrated in FIG. 1D, BSS1 can switch to channel B and avoid the radar, and thereby perform well, while BSS2 can detect the radar after a predetermined time, and as a result, remain in channel A.

SUMMARY OF THE INVENTION

The present general inventive concept provides a method and an apparatus to switch channels efficiently through negotiation using a dynamic frequency selection (DFS) mechanism defined in the IEEE 802.11h standard when radar and two or more basic service sets (BSSs) exist in the same channel such that each BSS cannot communicate appropriately.

The present general inventive concept also provides a method and an apparatus to perform efficient DFS wherein a BSS provides information regarding an original channel in which the BSS exists to another BSS or a plurality of BSSs which may exist in a new channel prior to switching to the new channel.

The present general inventive concept also provides a computer-readable recording medium storing a computer program to execute the methods described above.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a method of performing efficient DFS between BSSs in a same channel, wherein selecting a channel corresponding to a first device includes the first device performing negotiation with a second device to select a channel corresponding to the first device and another channel corresponding to the second device, and the first device to select a channel based on a negotiation result.

The foregoing and/or other aspects and utilities of the present general inventive concept may also be achieved by providing a computer-readable recording medium to store a computer program to execute the method of performing efficient DFS for BSSs in the same channel.

The foregoing and/or other aspects and utilities of the present general inventive concept may also be achieved by providing an apparatus to perform efficient DFS for BSSs in a same channel, wherein an apparatus to select a channel in a first device includes a negotiator to perform negotiation to select a channel corresponding to the first device and another channel corresponding to a second device, and a channel selector to select a channel corresponding to the first device based on a negotiation result.

The foregoing and/or other aspects and utilities of the present general inventive concept may also be achieved by providing an apparatus to select a channel in a first device, the apparatus including a negotiator to receive a data frame indicating whether a second device is able to negotiate with the first device and to transmit another data frame indicating whether the first device is able to negotiate with the second device, and a channel selector to select a channel to be used by the first device based on a negotiation result between the first device and the second device.

The negotiation result may be found by comparing a property of data to be transmitted and received by the first device and a property of data to be transmitted and received by the second device.

The channel selector may select the channel to be used by the first device by selecting a channel which is superior or inferior to a channel to be used by the second device based on the comparison result.

The property of the data may be a priority of the data or a bandwidth of the data.

The foregoing and/or other aspects and utilities of the present general inventive concept may also be achieved by providing a method of selecting a channel in a first device, the method including receiving a data frame indicating whether a second device is able to negotiate with the first device, transmitting another data frame indicating whether the first device is able to negotiate with the second device, and selecting a channel to be used by the first device based on a negotiation result between the first device and the second device.

The negotiation result may be found by comparing a property of data to be transmitted and received by the first device and a property of data to be transmitted and received by the second device.

The channel selecting may include selecting the channel in the first device which is superior or inferior to a channel to be used by the second device based on the comparison result.

The property of the data may be a priority of the data or a bandwidth of the data.

The foregoing and/or other aspects and utilities of the present general inventive concept may also be achieved by providing a computer readable recording medium having embodied thereon a computer program to execute a method, wherein the method includes receiving a data frame indicating whether a second device is able to negotiate with the first device, transmitting another data frame indicating whether the first device is able to negotiate with the second device, and selecting a channel to be used by the first device based on a negotiation result between the first device and the second device.

The foregoing and/or other aspects and utilities of the present general inventive concept may also be achieved by providing an apparatus to select a channel in a first device, the apparatus including a negotiator to receive a data frame indicating whether a second device is able to negotiate with the first device and to transmit another data frame indicating whether the first device is able to negotiate with the second device and to perform negotiation with a second device to obtain a channel to be used by the first device and a channel to be used by the second device, and a channel selector to select the channel to be used by the first device based on a negotiation result between the first device and the second device.

The foregoing and/or other aspects and utilities of the present general inventive concept may also be achieved by providing an apparatus to select a channel in a DFS system having a plurality of BSSs, including a device to negotiate with an external device to obtain a channel to be used according to information from the external device not to interface with a channel to be used in the external device.

The device may receive a request from the external device to negotiate for the channel to be used in the device in the channel to the external device.

The device may generate a data frame corresponding to the negotiation.

The device may receive a data frame corresponding to the negotiation.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
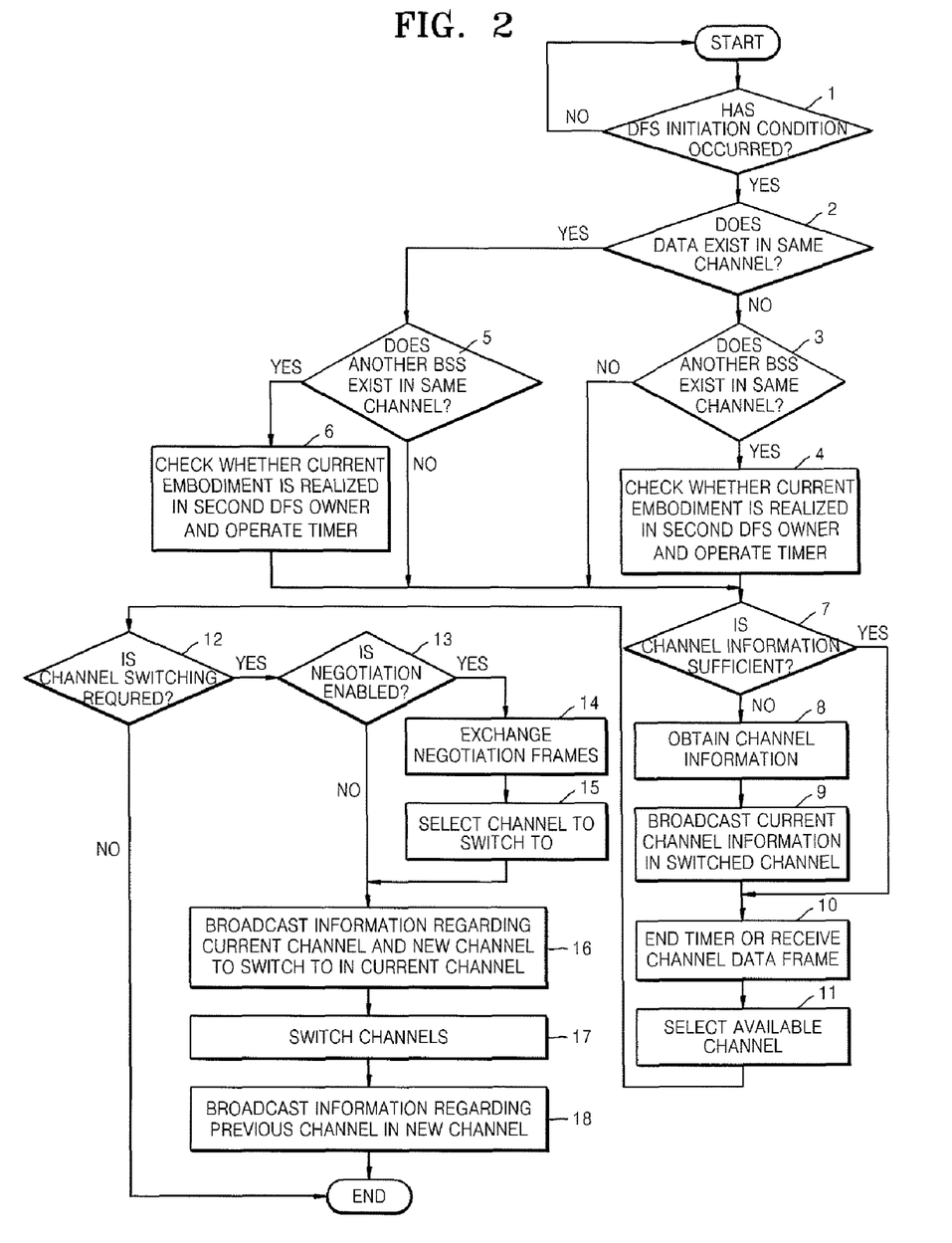
FIG. 2 is a flowchart of a method of performing efficient DFS between BSSs in the same channel according to an embodiment of the present general inventive concept.

FIG. 2 is a flowchart of a method of performing efficient dynamic frequency selection (DFS) between basic service sets (BSSs) in the same channel according to an embodiment of the present general inventive concept.

Referring to FIG. 2, efficient DFS between BSSs in the same channel according to the present general inventive concept is performed as follows. Particularly, the method of performing efficient DFS between BSSs in the same channel according to the DFS method is performed with time-series operations by a DFS owner (hereinafter referred to as a first DFS owner) of a BSS.

In operation 1, the first DFS owner of the BSS determines whether an initiation condition corresponding to DFS has occurred. Any station in the BSS can be the first DFS owner. However, when the BSS includes an infrastructure in which communication is performed by an access point (AP), the AP being a central element, only the AP can be the first DFS owner. An initiation condition to perform DFS in the BSS includes a situation where the first DFS owner in the BSS detects radar in a current channel of the first DFS owner. Next, a low success rate that falls below a predetermined level due to unidentified noise or channel deterioration is detected. Then, a low success rate that falls below a predetermined level is detected after detecting a new BSS. Finally, a new station in the BSS, which is not the first DFS owner, receives a measurement report defined in the IEEE 802.11h standard when a beacon, a probe response, or a channel switch announcement including channel information which is defined by the DFS method is received from a new BSS.

In operation 2, the first DFS owner of the BSS checks whether radar exists in the same channel. If radar does not exist, operation 3 is performed. If radar exists, operation 5 is performed.

In operation 3, the first DFS owner of the BSS checks whether a new BSS in addition to the BSS including the first DFS owner exists in the same channel. If a new BSS exists in the same channel, operation 4 is performed. If a new BSS does not exist, operation 7 is performed.

In operation 4, the first DFS owner of the BSS checks whether the DFS method to perform negotiation is realized in a new DFS owner (hereinafter referred to as a second DFS owner) of the new BSS in the same channel, and operates a timer.

Figure 3:
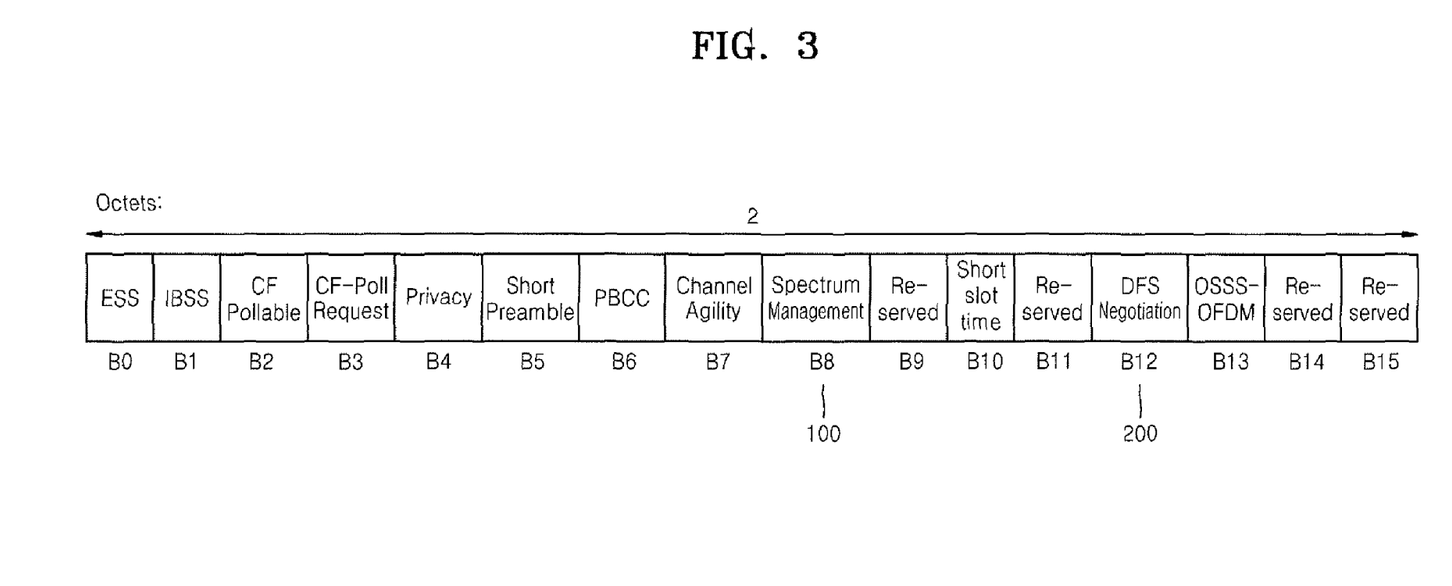
FIG. 3 illustrates a structure of a data frame to check whether the DFS is performed in the second DFS owner in operation 4 of FIG. 2 according to an embodiment of the present general inventive concept.

FIG. 3 illustrates a structure of a data frame to check whether the DFS method is realized in the second DFS owner in operation 4 of FIG. 2 according to an embodiment of the present general inventive concept.

Referring to FIG. 3, the data frame includes a function to check whether negotiation with the second DFS owner is enabled, which corresponds to a definition of a B12 bit field 200 in Capability Information Fixed Field according to the IEEE 802.11h standard. Based on responses from a B8 bit field 100 and B12 bit field 200 which are defined by the DFS method, the first DFS owner can check whether the DFS method is realized in the second DFS owner. The first DFS owner transmits a data frame of negotiation validation request illustrated in FIG. 3 to the second DFS owner and checks whether the DFS method is realized in the second DFS owner based on responses from a data frame of negotiation validation response received from the second DFS owner in which the B8 bit field 100 and the B12 bit field 200 are set. The B12 bit field 200 of DFS negotiation in FIG. 3 indicates whether the DFS method can be realized. When the B12 bit field 200 of the data frame of negotiation validation response is set, it is identified that the DFS method is realized in the second DFS owner. The B12 bit field 200 is valid only when a spectrum management bit of the B8 bit field 100 is set. That is, when the spectrum management bit of the B8 bit field 100 and a DFS negotiation bit of the B12 bit field 200 are set in the data frame of negotiation validation response, it is identified that the DFS method is realized in the second DFS owner and negotiation with the second DFS owner is enabled.

In contrast, when the spectrum management bit of the B8 bit field 100 is set while the DFS negotiation bit of B12 bit field 200 is not set, it is identified that the IEEE 802.11h standard is realized in the second DFS owner. When neither the spectrum management bit of the B8 bit field 100 nor the DFS negotiation bit of the B12 bit field 200 is set, the BSS including the second DFS owner is a common BSS in which neither the DFS method nor the IEEE 802.11h standard is realized. The data frame functions to check whether the DFS method is realized in the second DFS owner according to an embodiment of the present general inventive concept, and is not limited to the data frame illustrated in FIG. 3.

Referring back to FIG. 2, in operation 5, the first DFS owner checks whether another BSS exists in the same channel. When another BSS does not exist, operation 7 is performed. When another BSS exists, operation 6 is performed.

In operation 6, the first DFS owner transmits a data frame of negotiation validation request to the second DFS owner to check whether the DFS method is realized in the second DFS owner and negotiation with the second DFS owner is enabled, and receives a data frame of negotiation validation response from the second DFS owner. The data frame of negotiation validation request and negotiation validation response is illustrated in FIG. 3 and a method of checking whether negotiation with the second DFS owner is enabled is the same as the above-described method.

In operation 7, the first DFS determines whether channel information is sufficient to perform the channel switching. The determination can be performed by a channel information list structure in the first DFS owner, but is not limited thereto.

Figure 4:
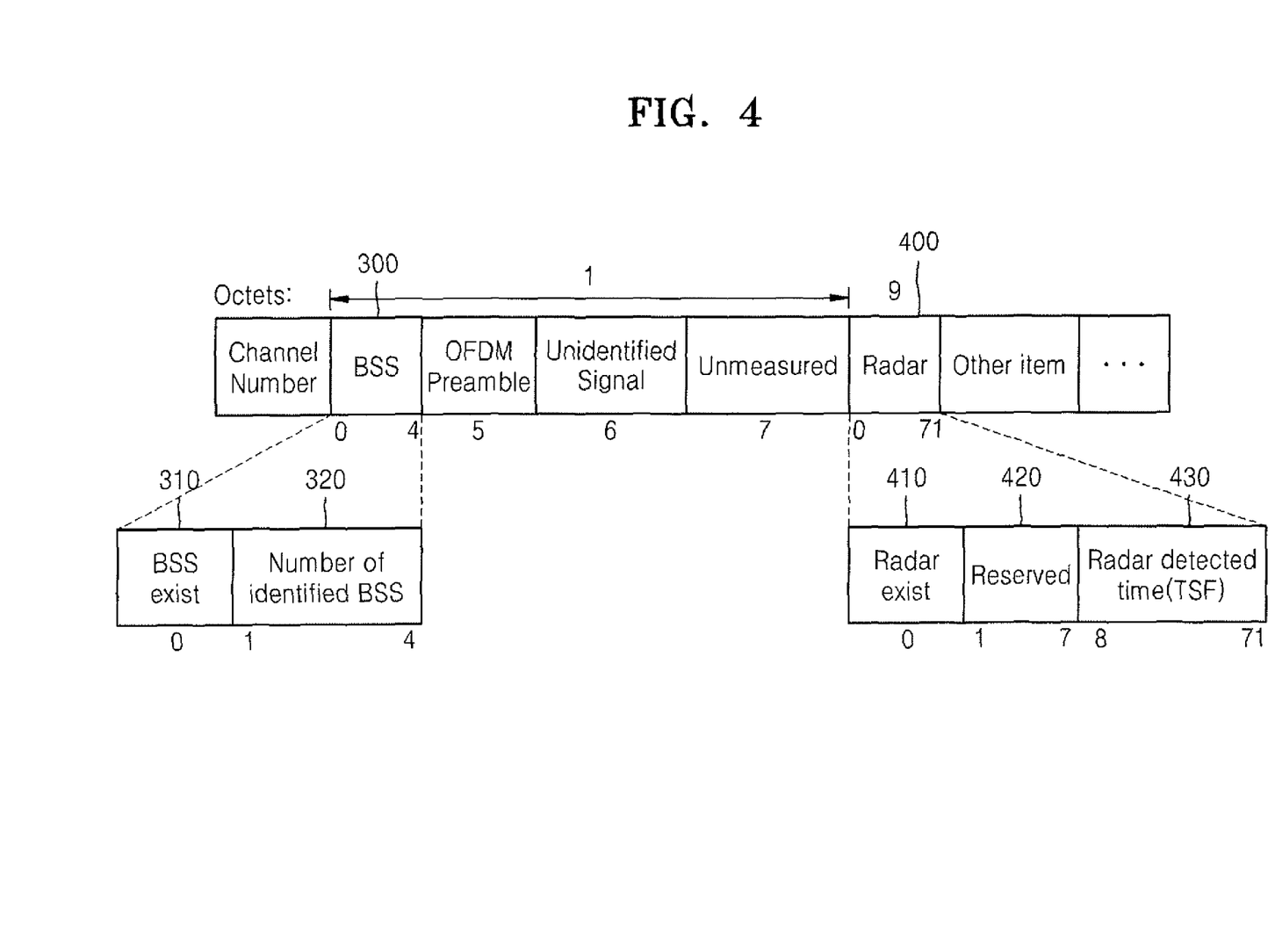
FIG. 4 illustrates a channel information list structure controlled by a DFS owner according to an embodiment of the present general inventive concept.

FIG. 4 illustrates the channel information list structure controlled by the DFS owner according to an embodiment of the present general inventive concept.

Referring to FIG. 4, the channel information list structure stores information used in DFS, transmit power control (TPC), etc. When new information regarding a channel is obtained, the information is reflected in the channel information list structure. The channel information list structure corresponds to definitions of a BSS field 300 and a radar field 400 in Basic Report according to the IEEE 802.11h standard. In DFS elements of the structure, the BSS field 300 includes a BSS exist field 310 and a number of identified BSSs field 320. The BSS exist field 310 is set when one or more BSSs exist in the channel and the number of identified BSSs field 320 indicates a number of BSSs accurately identified in the channel. The number of identified BSSs can be divided into a number of identified BSSs of the IEEE 802.11a family in the 5 GHz band, a number of identified BSSs of the IEEE802.11n family in the 5 GHz band, etc. The BSS exist field 310 and the number of identified BSSs field 320 support the first DFS owner in selecting a channel to switch to while performing DFS when a plurality of BSSs exist in all channels. Referring to the BSS exist field 310 and the number of identified BSSs field 320, the first DFS owner can distribute the same number of BSSs into every channel. The radar field 400 includes a radar exist field 410 and a radar detected time field 430. The radar detected time field 430 records a time when radar is detected based on a time of the current BSS. This is performed to avoid channel holding time in accordance with radar protection regulations of various countries. Accordingly, when information on a BSS bit of the BSS field 300 and a radar bit of the radar field 400 do not exist, new information to switch channels is required and operation 8 is performed. However, when sufficient information exists regarding the BSS bit of the BSS field 300 and the radar bit of the radar field 400, new information to switch channels is not required and operation 10 is performed.

Referring back to FIG. 2, in operation 8, the DFS owner obtains channel information regarding a new channel.

Figure 5:
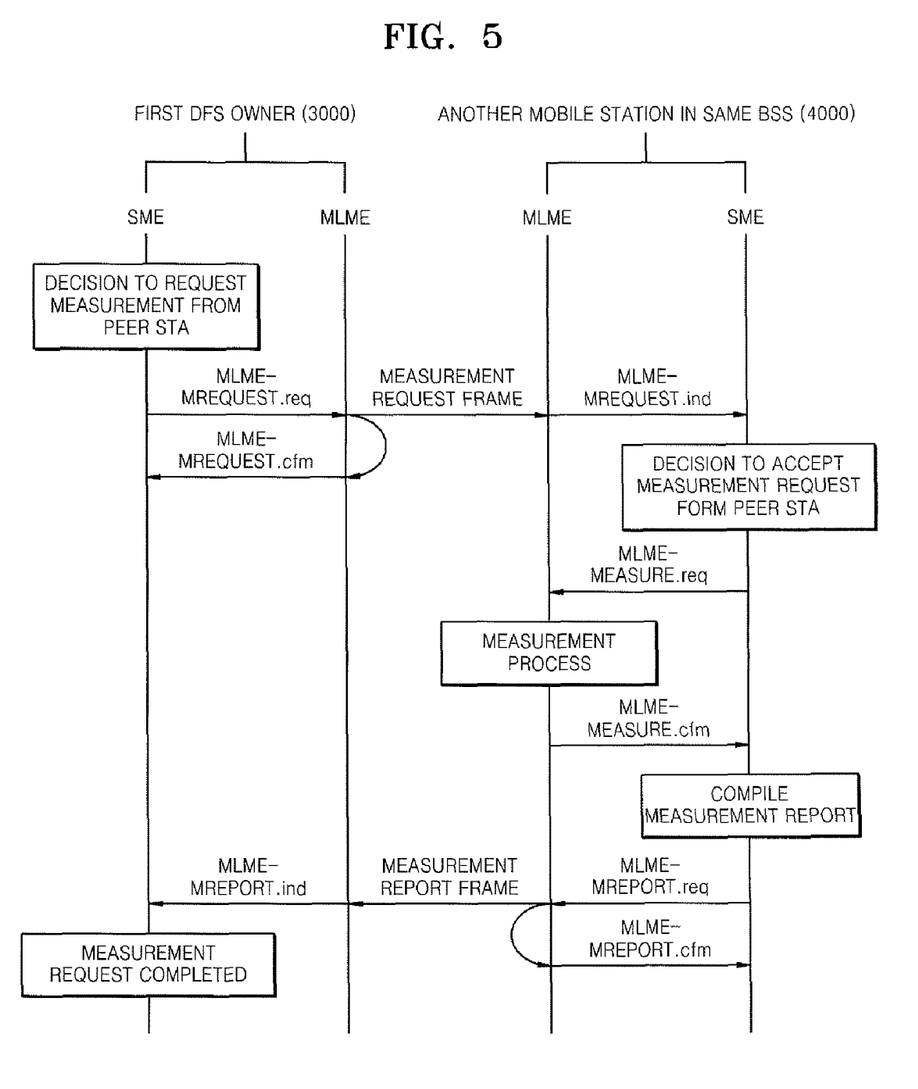
FIG. 5 illustrates a method of obtaining channel information defined in IEEE 802.11h standard according to an embodiment of the present general inventive concept.

FIG. 5 illustrates a method of obtaining channel information defined in the IEEE 802.11h standard according to an embodiment of the present general inventive concept.

Channel information is obtained according to the IEEE 802.11h standard by exchanging measurement frames. Media access control (MAC) sublayer management entity (MLME) of a first DFS owner 3000 requests information regarding a new channel from a new mobile station 4000 in the same BSS through a measurement request frame, and MLME of the new mobile station 4000 in the same BSS switches to the new channel and then obtains information regarding the new channel (this is referred to as a measurement process). The MLME of the mobile station 4000 in the same BSS transmits the obtained information to the first DFS owner 3000 through a measurement report frame. Thus, the first DFS owner 3000 obtains information regarding the new channel by receiving the measurement report frame from the new mobile station 4000 in the same BSS.

In operation 9 of FIG. 2, the new mobile channel 4000 in the same BSS which has switched to the new channel to obtain information regarding the new channel broadcasts information regarding the original channel including the first DFS owner, in the new channel. Thus, BSSs in the new channel may obtain information regarding the original channel including the first DFS owner 3000 through the broadcasted information.

Figure 6:
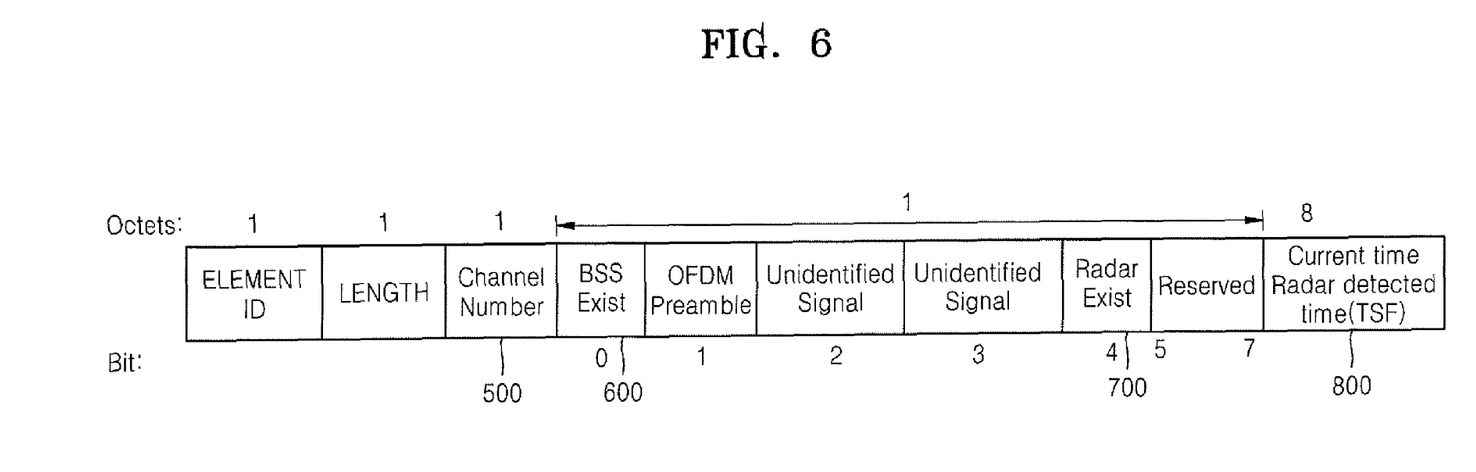
FIG. 6 illustrates channel information elements used in DFS according to an embodiment of the present general inventive concept.

FIG. 6 illustrates channel information elements used in DFS according to an embodiment of the present general inventive concept.

Referring to FIG. 6, the channel information elements are provided in a data frame including information regarding a channel. Information regarding radar and a BSS or a plurality of BSSs existing in the channel can be obtained by the channel information elements. The channel information elements may correspond to definitions of a channel number field 500, a BSS exist field 600, a radar exist field 700 and a current time-radar detected time (TSF) 800 to obtain information regarding a BSS or a plurality of BSSs and radar according to the IEEE 802.11 standard. The channel number field 500 identifies the channel, the BSS exist field 600 indicates whether a BSS exists or a plurality of BSSs exist, the radar exist field 700 indicates whether radar exists, and the current time-radar detected time (TSF) 800 indicates the time when radar is detected using a time series forecasting method to provide a reference to avoid channel holding time. These channel information elements are added to the elements of a data frame to be transmitted. The information regarding the current channel in operation 9 of FIG. 2 is stored in the channel number field 500, the BSS exist field 600, the radar exist field 700 and the current time-radar detected time (TSF) 800, respectively, and then is broadcasted. Thus, a BSS(s) obtains information regarding the current channel from these elements.

Referring to FIGS. 2 and 6, in operation 10, the first DFS owner checks whether a predetermined time has passed or if the data frame including channel information is received from the second DFS owner, when the timer indicates within a predetermined time. The channel information is added to the received data frame defined according to the IEEE 802.11h standard, which includes a channel switch announcement frame, a measurement report frame, etc. Channel information illustrated in FIG. 6 can be added to the data frame. If the data frame is not received during the predetermined time, it is identified that neither the DFS method nor the IEEE 802.11h standard is realized in the second DFS owner of the new BSS. If the data frame including channel information such as the channel switch announcement frame or the measurement report frame is received, the IEEE 802.11h standard is realized in the second DFS owner of the new BSS. Thus, checking whether the IEEE 802.11h standard is realized in the second DFS owner of the new BSS can be performed by receiving a data frame in operation 4, but is not limited thereto. It can also be performed by receiving a data frame of channel information such as a switch announcement frame or a measurement report frame in operation 10. Thus, the first DFS owner can obtain channel switching information of a new DFS owner by receiving channel information from a new channel.

In operation 11, the first DFS owner selects a new channel to switch to based on the channel information stored in the channel information list and the channel switching information of the new DFS owner received in operation 10.

In operation 12, cooperating with operation 11, the first DFS owner determines whether channel switching is required. The determination can be performed based on the information regarding the new channel. If another BSS or a plurality of BSSs or radar do not exist in the current channel such that the first DFS owner has no restrictions on communication in the current channel, the first DFS owner is not required to switch to a new channel. Likewise, if the second DFS owner of the other BSS in the same channel switches to a new channel, the first DFS owner determines not to switch channels. Thus, necessity of switching channels is determined by whether a channel to which the first DFS owner has to switch is the current channel. If the channel to which the first DFS owner has to switch is a new channel, proceed to operation 13. If the channel to which the first DFS owner has to switch is the current channel, end the process.

In operation 13, the first DFS owner determines whether negotiation with the second DFS owner is enabled, based on results from operations 4 and 10. If the first DFS owner determines that negotiation with the second DFS owner is enabled, proceed to operation 14. If the first DFS owner determines that negotiation with the second DFS owner is not enabled, proceed to operation 16.

In operation 14, the first and second DFS owners in which the DFS method is realized exchange negotiation frames with each other and obtain information regarding to which channel the other switches.

The negotiation frames may perform negotiation by exchanging channel information between the first and second DFS owners and include a negotiation frame of negotiation request and a negotiation frame of negotiation response.

Negotiation is determined by a property of data which is transmitted and received in each of the BSSs according to whether the IEEE 802.11h standard is realized. The property of data may be determined by a type of data, data bandwidth, transmission priority, etc. Transmission priority can be determined based on a type of data according to the IEEE 802.11e standard. A BSS or a plurality of BSSs to switch channels can be determined by inspecting if data has low weight or a small amount of data is to be transmitted by using the transmission priority during negotiation. When the IEEE 802.11e standard is not realized, a BSS or a plurality of BSSs to switch channels can be determined with respect to the amount of data transmission, etc.

In operation 15, the first DFS owner determines whether another DFS owner exists based on information of the negotiation frames exchanged in operation 14, and then selects a channel to switch to.

In operation 16, although a new channel to switch to has been determined, the first DFS owner may broadcast information regarding the current channel and the new channel to switch to corresponding to other BSSs which may exist in the current channel. The other BSSs can refer to channel information obtained from the broadcasting of the first DFS owner to select new channels to switch to. Here, the data frame of FIG. 6 can be added to a data frame of channel information to be transmitted.

In operation 17, the first DFS owner switches to the selected channel.

In operation 18, the first DFS owner in the new channel broadcasts information regarding a previous channel and then ends the process. The first DFS owner supports the channel selection process of the other BSSs by broadcasting information regarding the previous channel in the new channel. The data frame of FIG. 6 can be added to a data frame of channel information to be transmitted.

Figure 7A:
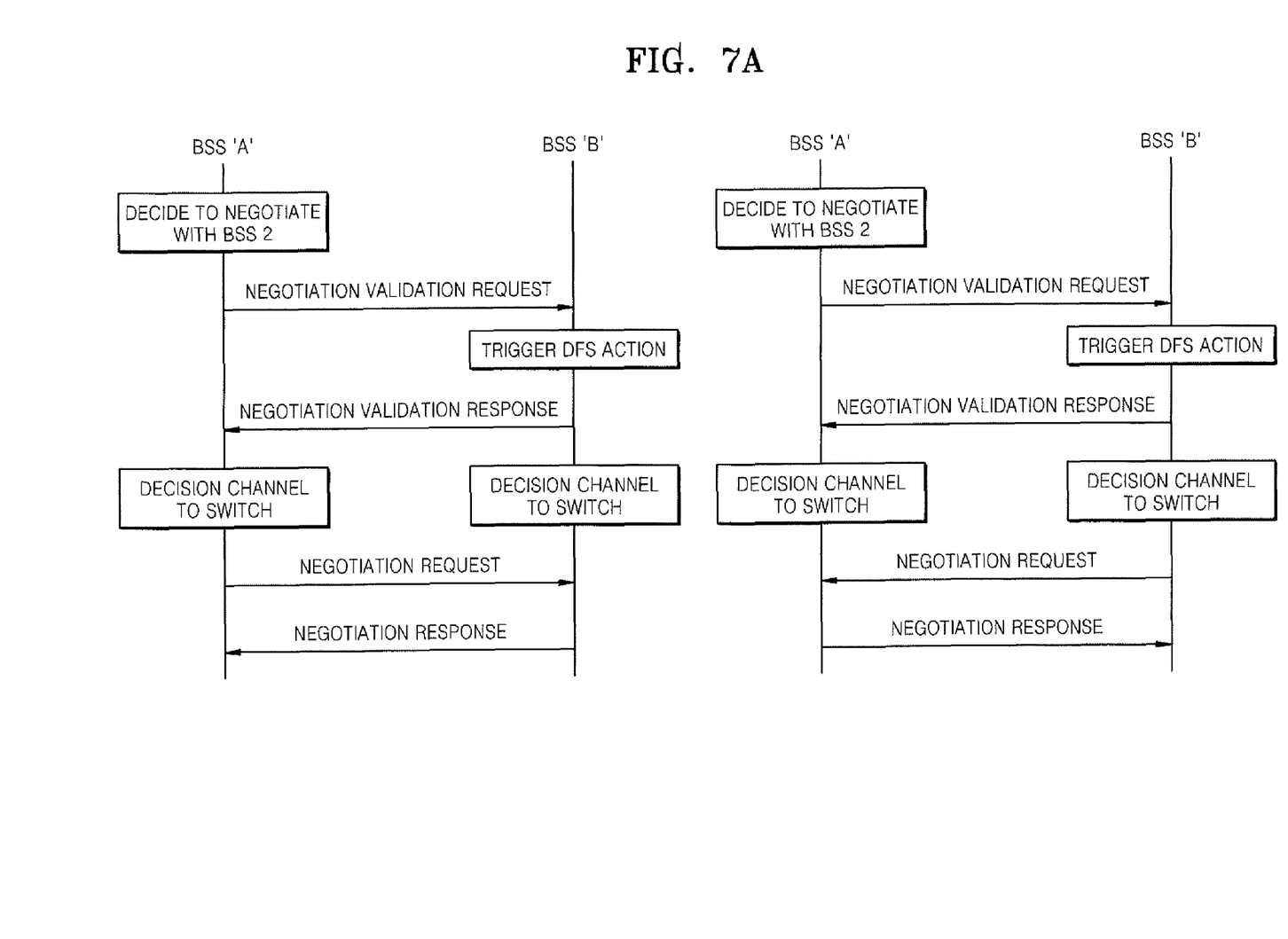
FIGS. 7A, 7B, and 7C illustrate differences of the DFS method corresponding to BSSs in detail with examples with respect to whether the DFS or the IEEE 802.11h standard is performed or not in the second DFS owner according to an embodiment of the present general inventive concept.
Figure 7B:
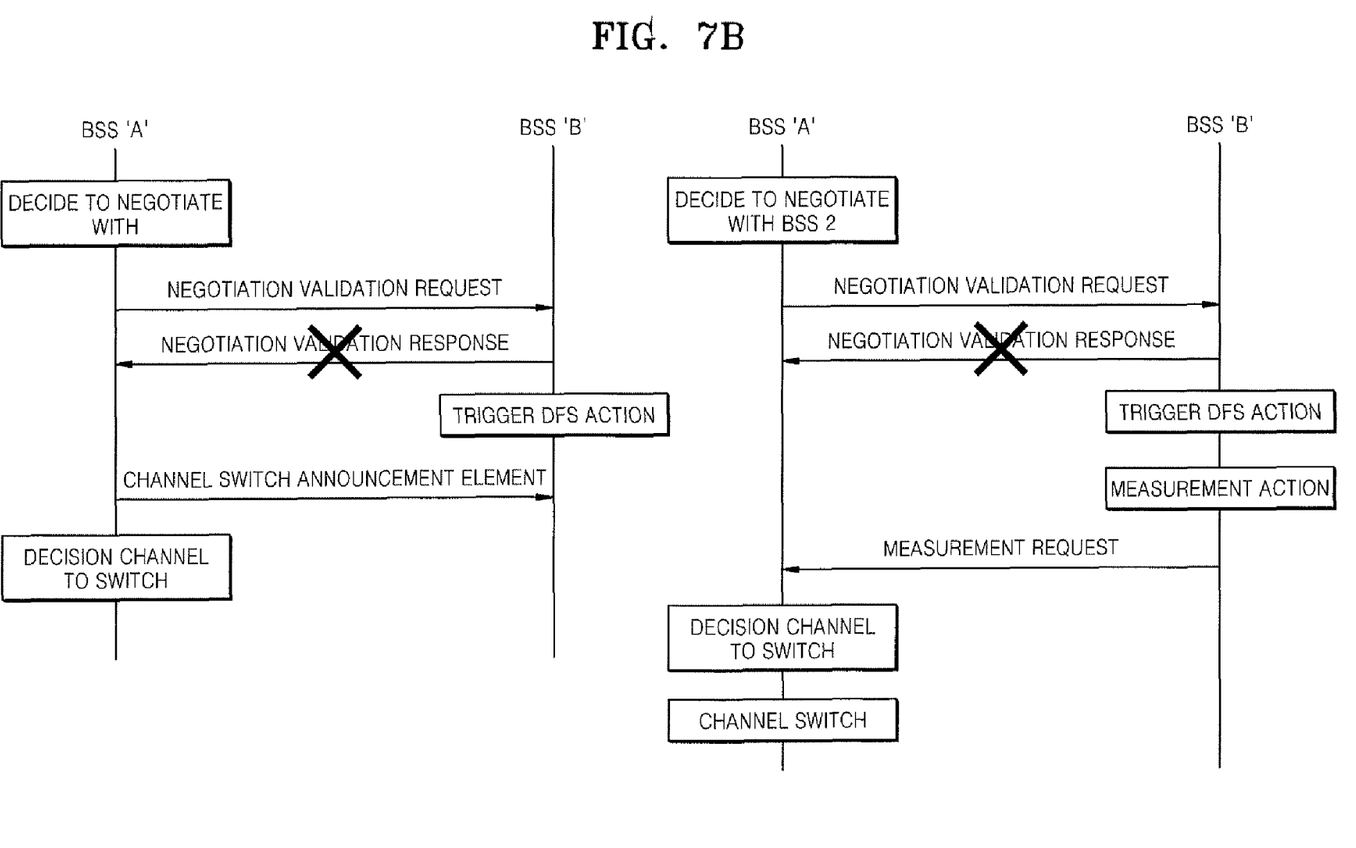
Figure 7C:
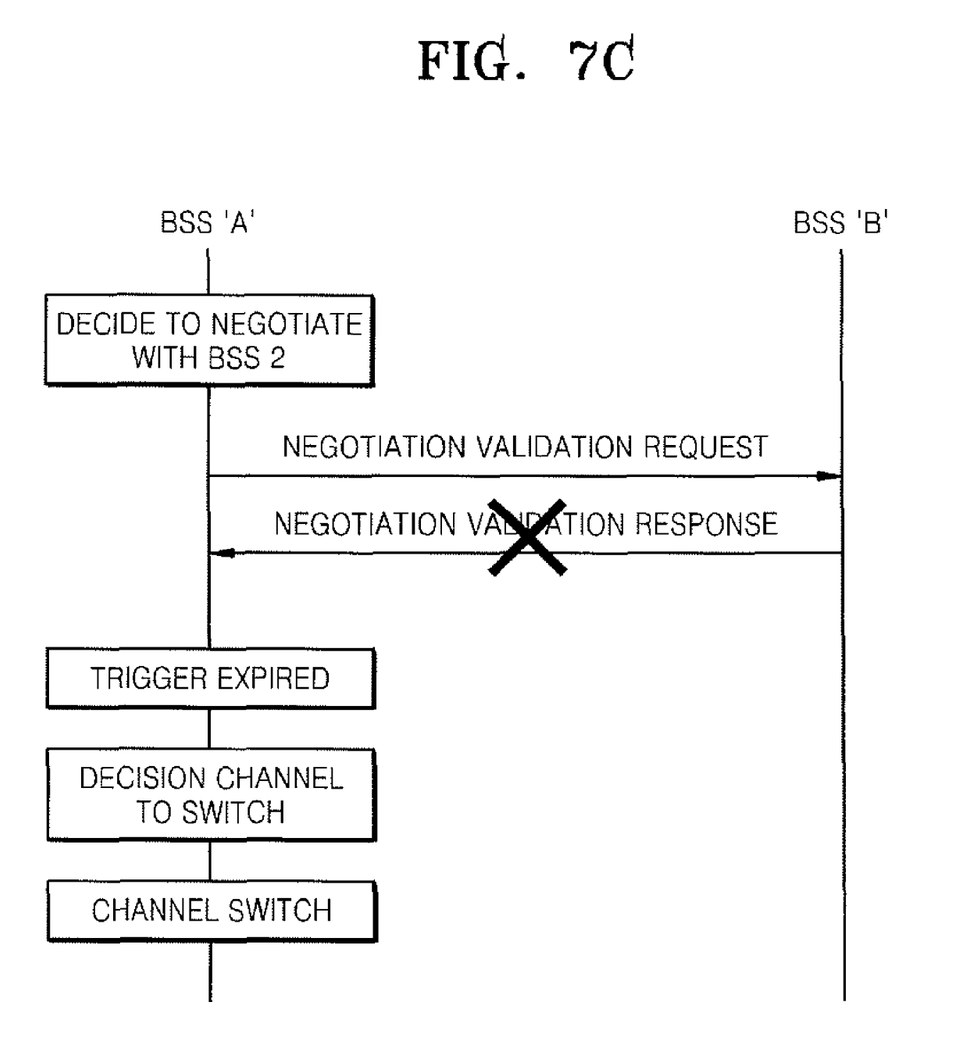

FIGS. 7A, 7B, and 7C illustrate differences of DFS for BSSs in detail with examples with respect to whether the DFS method or the IEEE 802.11h standard is realized in the second DFS owner according to an embodiment of the present general inventive concept.

FIG. 7A illustrates a process of DFS between BSSs when the DFS method is realized in the second DFS owner according to an embodiment of the present general inventive concept.

The first DFS owner transmits a data frame of a negotiation validation request to request a response from the second DFS owner as to whether the DFS method is realized in the second DFS owner.

In response to the negotiation validation request, the second DFS owner transmits a data frame of negotiation validation response to the first DFS owner to identify that the DFS method is realized. The channel information structure list of FIG. 3 can be used in the data frame of negotiation validation request. It is identified that the DFS method is realized in the second DFS owner when the B8 bit field 100 and the B12 bit field 200 of the channel information structure list of FIG. 3 are set in negotiation validation response.

As described above, the first and second DFS owners determine whether negotiation is enabled by exchanging the data frames of negotiation validation request and negotiation validation response and then determine which channels to switch to by exchanging negotiation frames of negotiation request and negotiation response.

FIG. 7B illustrates a process of DFS for BSSs when the IEEE 802.11h standard is realized in the second DFS owner according to an embodiment of the present general inventive concept.

The first DFS owner transmits a data frame of negotiation validation request to request a response from the second DFS owner as to whether the DFS method is realized in the second DFS owner. The channel information structure list of FIG. 3 can be used in the data frame of negotiation validation request to be transmitted. When the channel information structure list of FIG. 3 which is set to only the B8 bit field 100 is received, or when data frames of a channel switch announcement or a measurement report are received, it is identified that the IEEE 802.11h standard is realized in the second DFS owner and consequently the first DFS owner determines a channel to switch to.

FIG. 7C illustrates a process of DFS between BSSs when neither the DFS method nor the IEEE 802.11h standard is realized in the second DFS owner according to an embodiment of the present general inventive concept.

The first DFS owner transmits a data frame of negotiation validation request to request a response from the second DFS owner as to whether the DFS method is realized in the second DFS owner. The channel information structure list of FIG. 3 can be used in the data frame of negotiation validation request to be transmitted. When the channel information structure list of FIG. 3 which is set neither the B8 bit field 100 nor the B12 bit field 200 is received, or when no response is received from the second DFS owner, it is identified that neither the DFS method nor the IEEE 802.11h standard is realized in the second DFS owner.

In this case, the first DFS owner may refer to a channel information list in the DFS owner to determine a channel to switch to.

Figure 8:
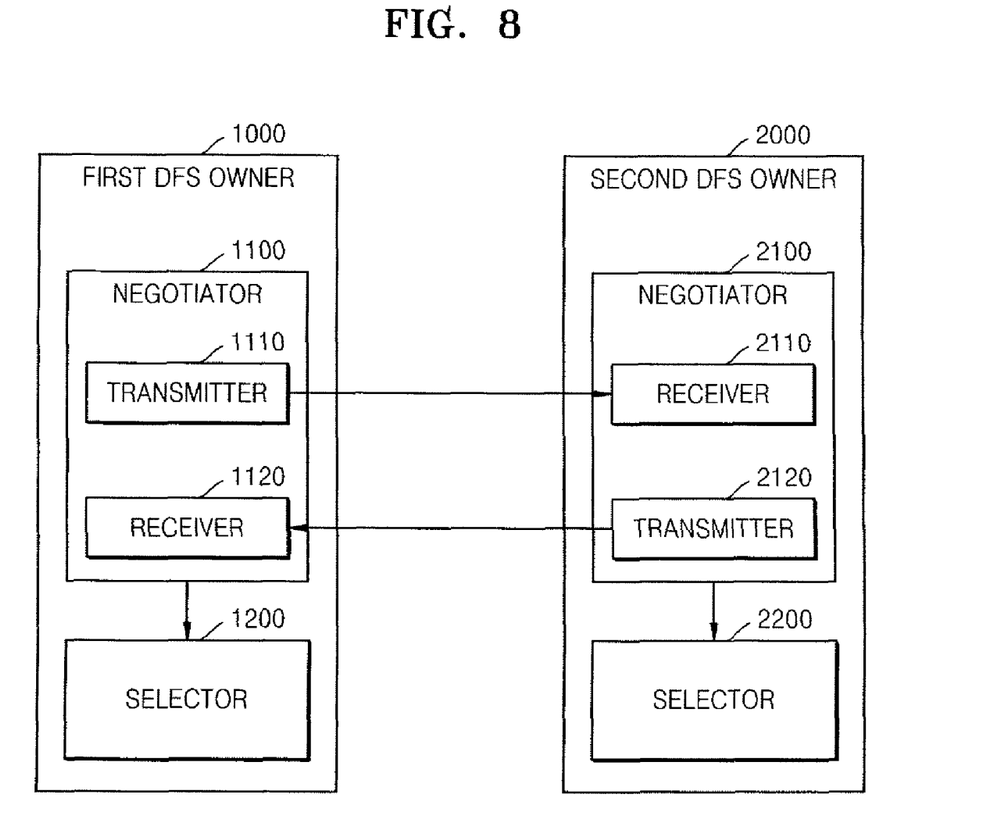
FIG. 8 illustrates an apparatus to perform efficient DFS between BSSs in a same channel according to an embodiment of the present general inventive concept.

FIG. 8 illustrates an apparatus to perform efficient DFS corresponding to BSSs in the same channel according to an embodiment of the present general inventive concept.

Referring to FIG. 8, a first DFS owner 1000 includes a negotiator 1100 and a selector 1200.

The negotiator 1100 includes a transmitter 1110 to request a response from the second DFS owner 2000 to indicate whether the DFS method is realized in the second DFS owner 2000 such that negotiation is enabled, and a receiver 1120 to receive a response corresponding to a negotiation request. The negotiator 1100 performs negotiation to determine a channel to be used. In the negotiation to determine a channel to be used, required information is included in the first DFS owner 1000 and the information is stored in a storage unit (not illustrated) of the negotiator 1100.

The transmitter 1110 transmits a data frame to request from a second DFS owner 2000 a response to indicate whether the DFS method is realized in the second DFS owner 2000 such that negotiation is enabled, and provides channel switching information to other BSSs which may exist in the same channel by broadcasting the channel switching information to the channel in which the first DFS owner 1000 exists.

The receiver 1120 receives a data frame from the second DFS owner 2000 which identifies whether the DFS method is realized such that negotiation is enabled. Assuming that the data frame of FIG. 3 is received, both the B8 bit field 100 and the B12 bit field 200 are set if the DFS method is realized, only the B8 bit field 100 is set if the IEEE 802.11h standard is realized, and neither the B8 bit field 100 nor the B12 bit field 200 is set if neither the DFS method nor the IEEE 802.11h standard is realized.

The selector 1200 selects a channel to be used by the first DFS owner based on channel information included in the first DFS owner 1000 and a negotiation result of the negotiator 1100.

The second DFS owner 2000 includes a negotiator 2100 and a selector 2200 according to the present general inventive concept.

The negotiator 2100 includes a receiver 2110 to receive a data frame to request whether the DFS method is realized in the second DFS owner 2000 such that negotiation is enabled from the first DFS owner 1000, and a transmitter 2120 to transmit a response corresponding to the negotiation request.

The receiver 2110 receives a data frame requesting whether the DFS method is realized in the second DFS owner 2000 from the first DFS owner 1000. The data frame of FIG. 3 can be used.

The transmitter 2120 transmits a data frame to identify whether the DFS method is realized to the first DFS owner 1000. Assuming that the data frame of FIG. 3 is received, both the B8 bit field 100 and the B12 bit field 200 are set if the DFS method is realized, only the B8 bit field 100 is set if the IEEE 802.11h standard is realized, and neither the B8 bit field 100 nor the B12 bit field 200 is set if neither the DFS method nor the IEEE 802.11h standard is realized.

The selector 2200 selects a channel to be used based on a negotiation result after performing negotiation with the first DFS owner 1000 through the negotiator 2100 when the DFS method is realized in the second DFS owner 2000 such that negotiation corresponding to a channel to be used is performed. When negotiation is not performed, the selector 2200 determines to switch channels based on channel information of the second DFS owner 2000.

As described above, a method of DFS for BSSs in the same channel for wireless LAN using a 5 GHz band according to the present general inventive concept includes negotiation of DFS corresponding to BSSs, which is not included in a conventional method, such that DFS is performed more efficiently. Also, a method of DFS according to the present general inventive concept provides a method of DFS with a BSS having a conventional DFS function or with a BSS having no DFS function such that DFS is performed efficiently regardless of negotiation capability of a DFS owner.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of selecting a channel in a first device in a wireless LAN, the method comprising:
obtaining information regarding a plurality of channels, wherein the information comprises radar signals or at least one communication area device, which affects communication of the first device if the radar signals or at least one communication area device exists in a channel used by the first device, existing in the channels;
determining whether channel switching of the first device is required based on the obtained information;
performing negotiation by the first device with a second device to obtain a channel to be used by the first device and a channel to be used by the second device if it is determined that the channel switching of the first device is required,
selecting the channel to be used by the first device based on a negotiation result by the first device; and broadcasting information regarding the channel which is used in the communication area of the first device and the channel to be used in a communication area of the first device,
wherein the negotiation with the second device is performed by exchanging negotiation frames,
wherein the performing of the negotiation comprises comparing a property of data to be transmitted and received by the first device and a property of data to be transmitted and received by the second device, and then selecting a channel which is superior or inferior to the channel to be used by the second device based on the comparison result.

2. The method of claim 1, wherein the performing of the negotiation with the second device comprises obtaining information on the channel to be used in a communication area of the first device and the channel to be used in a communication area of the second device.

3. The method of claim 2, wherein the performing of the negotiation comprises performing the negotiation when the channel which is used in the communication area of the first device and the channel which is used in the communication area of the second device are identical.

4. The method of claim 1, wherein the performing of the negotiation comprises performing the negotiation when the channel which is used by the first device and the channel which is used by the second device are identical.

5. The method of claim 1, further comprising:
requesting information regarding whether the negotiation is enabled from the second device,
wherein the performing of the negotiation with the second device comprises performing negotiation when a response of the request indicates that the negotiation is enabled.

6. The method of claim 5, further comprising:
selecting another channel excepting the channel to be used by the second device when the response of the request indicates that the negotiation is not enabled.

7. The method of claim 1, wherein the property comprises a priority of the data or a bandwidth of the data.

8. The method of claim 1, wherein the performing of the negotiation comprises receiving information regarding the channel to be used by the second device and selecting another channel excepting the channel to be used by the second device when the received information indicates that the channel to be used by the first device and the channel to be used by the second device are identical.

9. The method of claim 1, wherein:
the first device obtains information regarding a channel which is used by the first channel and a channel in which radar exists; and the performing of the negotiation with the second device comprises selecting the channel to be used by the first device and the channel to be used by the second device based on the information regarding channels.

10. A non-transitory computer-readable recording medium to store a computer program to execute a method of selecting a channel in a wireless LAN, the method comprising:
obtaining information regarding a plurality of channels, wherein the information comprises radar or at least one communication area device, which affects communication of the first device if the radar signals or at least one communication area device exists in a channel used by the first device, existing in the channels;
determining whether channel switching of first device is required based on the obtained information;
performing negotiation by a first device with a second device to obtain a channel to be used by the first device and a channel to be used by the second device if it is determined that the channel switching of the first device is required,
selecting the channel to be used by the first device based on a negotiation result by the first device; and
broadcasting information regarding the channel which is used in the communication area of the first device and the channel to be used in a communication area of the first device,
wherein the negotiation with the second device is performed by exchanging negotiation frames,
wherein the performing of the negotiation comprises comparing a property of data to be transmitted and received by the first device and a property of data to be transmitted and received by the second device, and then selecting a channel which is superior or inferior to the channel to be used by the second device based on the comparison result.

11. An apparatus to select a channel in a first device in a wireless LAN, the apparatus comprising:
the first device to obtain information regarding a plurality of channels, wherein the information comprises radar signals or at least one communication area device, which affects communication of the first device if the radar signals or at least one communication area device exists in a channel used by the first device, existing in the channels;
the first device to determine whether channel switching of the first device is required based on the obtained information;
a negotiator in the first device to perform negotiation with a second device to obtain a channel to be used by the first device and a channel to be used by the second device,
a channel selector in the first device to select the channel to be used by the first device based on a negotiation result; and
the first device to broadcast information regarding the channel which is used in the communication area of the first device and the channel to be used in a communication area of the first device,
wherein the negotiator performs the negotiation with the second device by exchanging negotiation frames,
wherein the negotiation result is found by comparing a property of data to be transmitted and received by the first device and a property of data to be transmitted and received by the second device.

12. The apparatus of claim 11, wherein:
the first device obtain information regarding a channel which is used by the first channel and a channel in which radar exists; and
the negotiator performs negotiation with the second device to select the channel to be used by the first device and the channel to be used by the second device based on the information regarding channels.

13. The apparatus of claim 11, wherein the negotiator comprises:
a transmitter to request from the second device a response as to whether the negotiation is enabled; and
a receiver to receive a response corresponding to the request.

14. An apparatus to select a channel in a first device in a wireless LAN, the apparatus comprising:
the first device to obtain information regarding a plurality of channels, wherein the information comprises radar signals or at least one communication area device, which affects communication of the first device if the radar signals or at least one communication area device exists in a channel used by the first device, existing in the channels;
the first device to determine whether channel switching of the first device is required based on the obtained information;
a negotiator in the first device to receive a data frame indicating whether a second device is able to negotiate with the first device and to transmit another data frame indicating whether the first device is able to negotiate with the second device; and
a channel selector in the first device to select a channel to be used by the first device based on a negotiation result between the first device and the second device; and
the first device to broadcast information regarding the channel which is used in the communication area of the first device and the channel to be used in a communication area of the first device,
wherein the negotiator performs the negotiation with the second device by exchanging negotiation frames,
wherein the negotiation result is found by comparing a property of data to be transmitted and received by the first device and a property of data to be transmitted and received by the second device.

15. The apparatus of claim 14, wherein the channel selector selects the channel to be used by the first device by selecting a channel which is superior or inferior to a channel to be used by the second device based on the comparison result.

16. The apparatus of claim 15, wherein the property of the data is a priority of the data or a bandwidth of the data.

17. A method of selecting a channel in a first device in a wireless LAN, the method comprising:
obtaining information regarding a plurality of channels, wherein the information comprises radar signals or at least one communication area device, which affects communication of the first device if the radar signals or at least one communication area device exists in a channel used by the first device, existing in the channels;
determining whether channel switching of first device is required based on the obtained information;
receiving a data frame indicating whether a second device is able to negotiate with the first device if it is determined that the channel switching of the first device is required;
transmitting another data frame indicating whether the first device is able to negotiate with the second device; and
selecting a channel to be used by the first device based on a negotiation result between the first device and the second device by the first device; and,
broadcasting information regarding the channel which is used in the communication area of the first device and the channel to be used in a communication area of the first device,
wherein the negotiation result is found by comparing a property of data to be transmitted and received by the first device and a property of data to be transmitted and received by the second device.

18. The method of claim 17, wherein the channel selecting comprises:
selecting the channel in the first device which is superior or inferior to a channel to be used by the second device based on the comparison result.

19. The method of claim 18, wherein the property of the data is a priority of the data or a bandwidth of the data.

20. A non-transitory computer readable recording medium having embodied thereon a computer program to execute a method in a wireless LAN, wherein the method comprises:
obtaining information regarding a plurality of channels, wherein the information comprises radar or at least one communication area device, which affects communication of the first device if the radar signals or at least one communication area device exists in a channel used by the first device, existing in the channels;
determining whether channel switching of first device is required based on the obtained information;
receiving a data frame indicating whether a second device is able to negotiate with the first device if it is determined that the channel switching of the first device is required;
transmitting another data frame indicating whether the first device is able to negotiate with the second device; and
selecting a channel to be used by the first device based on a negotiation result between the first device and the second device by the first device; and
broadcasting information regarding the channel which is used in the communication area of the first device and the channel to be used in a communication area of the first device,
wherein the negotiation result is found by comparing a property of data to be transmitted and received by the first device and a property of data to be transmitted and received by the second device.

* * * * *